United States Patent
Sokolov et al.

(10) Patent No.: US 10,116,695 B1
(45) Date of Patent: Oct. 30, 2018

(54) SYSTEMS AND METHODS FOR VERIFYING THAT OPERATORS ARE HUMAN BASED ON OPERATOR GAZE

(71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 310 days.

(21) Appl. No.: 15/014,050

(22) Filed: Feb. 3, 2016

(51) Int. Cl.
*G06F 11/00* (2006.01)
*H04L 29/06* (2006.01)
*G06F 3/01* (2006.01)
*G06K 9/00* (2006.01)

(52) U.S. Cl.
CPC .......... *H04L 63/1483* (2013.01); *G06F 3/013* (2013.01); *G06K 9/00617* (2013.01); *G06K 9/00899* (2013.01)

(58) Field of Classification Search
CPC . H04L 63/1483; G06F 3/013; G06K 9/00617; G06K 9/00899
See application file for complete search history.

(56) References Cited

U.S. PATENT DOCUMENTS

| | | | | |
|---|---|---|---|---|
| 2008/0066014 A1* | 3/2008 | Misra | ...................... | G06F 21/36 715/846 |
| 2012/0243729 A1* | 9/2012 | Pasquero | ................ | G06F 3/013 382/103 |
| 2018/0018514 A1* | 1/2018 | Azam | ................ | G06K 9/00577 |

FOREIGN PATENT DOCUMENTS

WO    WO2016133540 A1 *  8/2016

OTHER PUBLICATIONS

Keith Newstadt, et a.l; Systems and Methods for Facilitating Eye Contact During Video Conferences; U.S. Appl. No. 14/958,273, filed Dec. 3, 2015.
"Eye tracking", https://en.wikipedia.org/wiki/Eye_tracking, as accessed Oct. 22, 2015, Wikipedia, (Nov. 5, 2005).
"xLabs", https://xlabsgaze.com/, as accessed Dec. 14, 2015, (Dec. 3, 2014).
"reCAPTCHA", https://www.google.com/recaptcha/intro/index.html, as accessed Dec. 14, 2015, Google, (Apr. 17, 2014).
"Are you a human", http://demo.areyouahuman.com/, as accessed Dec. 14, 2015, (On or before Dec. 14, 2015).
Tatler, Benjamin W., et al., "Yarbus, eye movements, and vision", http://www.ncbi.nlm.nih.gov/pmc/articles/PMC3563050/, as accessed Dec. 14, 2015, Iperception, (Jul. 2010).

(Continued)

*Primary Examiner* — Baotran N To
(74) *Attorney, Agent, or Firm* — FisherBroyles, LLP

(57) ABSTRACT

The disclosed computer-implemented method for verifying that operators are human based on operator gaze may include (1) presenting an image to a user of the computing device via a display element of the computing device, (2) tracking the user's gaze as the image is presented to the user, (3) determining, based on an analysis of the user's gaze, that one or more patterns of the user's gaze are consistent with one or more human gaze patterns, and (4) classifying the user as a human in response to determining that the one or more patterns of the user's gaze are consistent with one or more human gaze patterns. Various other methods, systems, and computer-readable media are also disclosed.

20 Claims, 9 Drawing Sheets

(56) References Cited

OTHER PUBLICATIONS

Archibald, Sasha, "Ways of Seeing", http://www.cabinetmagazine.org/issues/30/archibald.php, as accessed Dec. 14, 2015, The Underground, Issue 30, Cabinet Magazine, (Summer 2008).
"About US: What Is Eyetracking?", http://www.eyetracking.com/About-Us/What-Is-Eye-Tracking, as accessed Oct. 22, 2015, (May 30, 2011).
"Eye tracking (gaze tracking)", http://whatis.techtarget.com/definition/eye-tracking-gaze-tracking, as accessed Oct. 22, 2015, (Jan. 2013).
"Webcam", https://en.wikipedia.org/wiki/Webcam, as accessed Oct. 22, 2015, (Jan. 13, 2004).
"Face detection", https://en.wikipedia.org/wiki/Face_detection, as accessed Oct. 22, 2015, Wikipedia, (Aug. 15, 2004).
"Facial recognition system", https://en.wikipedia.org/wiki/Facial_recognition_system, as accessed Oct. 22, 2015, Wikipedia, (Aug. 13, 2004).
"Object-class detection", https://en.wikipedia.org/wiki/Object-class_detection, as accessed Oct. 22, 2015, Wikipedia, (Apr. 3, 2015).
"Streaming media", https://en.wikipedia.org/wiki/Streaming_media, as accessed Oct. 22, 2015, Wikipedia, (Jan. 13, 2004).
"Videoconferencing", https://en.wikipedia.org/wiki/Videoconferencing, as accessed Oct. 22, 2015, Wikipedia, (Jan. 7, 2004).
Kieldsen, Sam, "Kinect lets you look your Skype caller in the eye", http://www.pcauthority.com.au/News/355066,kinect-lets-you-look-your-skype-caller-in-the-eye.aspx, as accessed Oct. 22, 2015, PC & Tech Authority, (Aug. 29, 2013).
"About CatchEye", https://catch-eye.com/people, as accessed Oct. 22, 2015, (Feb. 5, 2015).
"CatchEye", https://catch-eye.com/, as accessed Oct. 22, 2015, (Mar. 17, 2004).
"Video Conferencing using Intel® Media SDK", https://software.intel.com/en-us/articles/video-conferencing-using-media-sdk?language=it, as accessed Oct. 22, 2015, (Apr. 29, 2013).
"Hangouts", https://apps.google.com/products/hangouts/, as accessed Oct. 22, 2015, Google Apps for Work, (On or before Oct. 22, 2015).
"Cisco Unified Videoconferencing 3500 Series Products", http://www.cisco.com/c/en/us/products/video/unified-videoconferencing-3500-series/index.html, as accessed Oct. 22, 2015, (Feb. 23, 2014).
"Online meetings and teamwork made easy", https://products.office.com/en-us/business/office-365-video-conferencing, as accessed Oct. 22, 2015, Office 365, Microsoft, (Oct. 18, 2014).
Patel, Neil, "8 Powerful Takeaways from Eye Tracking Studies", https://www.quicksprout.com/2014/04/16/8-powerful-takeaways-from-eye-tracking-studies/, as accessed Oct. 22, 2015, (Apr. 16, 2014).

* cited by examiner

Prompts
124

Look at the faces of the children.

It looks like it might rain.

I think I'm in danger!

Am I going to find the right girl to marry?

How old are the people in this picture?

*FIG. 5*

SYSTEMS AND METHODS FOR VERIFYING THAT OPERATORS ARE HUMAN BASED ON OPERATOR GAZE

BACKGROUND

Cloud services are constantly attacked by online hackers. In some cases, online hackers attack cloud services using automated procedures (such as bots) that push legitimate users away from online goods and resources (e.g., by beating them to online sales) or to log into legitimate user accounts (e.g., using brute force). Many cloud services respond to such threats by implementing protocols for detecting automated procedures. For example, a cloud service may require that users verify that they are human before allowing the users to complete certain tasks. Verification protocols traditionally involve asking users to complete a challenge, such as solving a logical problem. For example, a cloud service may show an image containing obscured characters to a user and then ask the user to determine which characters the obscured characters represent and to submit information identifying the characters.

Unfortunately, traditional challenges may be tedious and difficult to solve. As a result, human users may fail the challenges or experience frustration in attempting to complete them. Furthermore, many traditional challenges may be easily parsed by attacking software. In consequence, attacking software may successfully complete such challenges, leading to a false positive human verification. Accordingly, the instant disclosure identifies a need for improved systems and methods for human verification that is both easy for humans to successfully complete and difficult for attacking software to mimic.

SUMMARY

As will be described in greater detail below, the instant disclosure describes various systems and methods for determining whether operators are humans by presenting images to operators and determining whether the gaze patterns of the operators with respect to the image match human gaze patterns. In one example, a computer-implemented method for verifying that operators are human may include (1) presenting an image to a user of a computing device via a display element of the computing device, (2) tracking the user's gaze as the image is presented to the user, (3) determining, based on an analysis of the user's gaze, that one or more patterns of the user's gaze are consistent with one or more human gaze patterns, and (4) classifying the user as a human in response to determining that the one or more patterns of the user's gaze are consistent with one or more human gaze patterns.

In some examples, the image may be presented to the user in response to determining that the user has attempted to perform an action that an online service has indicated may only be performed by human operators. In additional or alternative examples, the image may be presented to the user in response to identifying a request to provide human verification for the user. In one example, presenting the image to the user may include presenting a motion picture image and/or a static image.

In one embodiment, the method may further include, prior to presenting the image to the user, presenting a prompt that primes the user to gaze at the image in a particular way. In some examples, determining that the patterns of the user's gaze are consistent with the human gaze patterns may include determining that the patterns of the user's gaze are consistent with one or more gaze patterns of humans who, prior to being presented with an instance of the image, have also been presented with an instance of the prompt.

In some examples, tracking the user's gaze may include tracking (1) one or more portions of the image at which the user is gazing, (2) an order in which the user gazes at the one or more portions, (3) a duration for which the user gazes at each of the one or more portions, (4) a duration for which the user gazes at a certain portion of the image, and/or (5) a duration for which the user gazes at any portion within the image.

In some embodiments, determining that the patterns of the user's gaze are consistent with the human gaze patterns may include determining that (1) the user's gaze is directed at a certain location and (2) a human who is presented with the image is likely to gaze at the certain location. Additionally or alternatively, determining that the patterns of the user's gaze are consistent with the human gaze patterns may include determining that (1) the user's gaze shifts from a first location to an additional location and (2) a human who is presented with the image is likely to shift his or her gaze from the first location to the additional location.

In one example, determining that the patterns of the user's gaze are consistent with human gaze patterns may include determining that the user's gaze is maintained for a certain period of time that falls within a range of time periods for which a human is likely to gaze at the image. In some examples, the computer-implemented method may further include identifying the human gaze patterns based on human gaze patterns of a group of humans while the humans were being presented with the image. In some examples, the computer-implemented method may further include obtaining human gaze patterns from a supervised test group and/or via unsupervised crowd surfing based on gaze data obtained from a website of an online service whose primary purpose in presenting the image is not collecting gazing data about the image.

In one embodiment, the computer-implemented method may further include (1) presenting the image to an additional user of an additional computing device via a display element of the additional computing device, (2) tracking the additional user's gaze as an instance of the image is presented to the additional user, (3) determining, based on an analysis of the additional user's gaze, that one or more patterns of the additional user's gaze are not consistent with the human gaze patterns, and (4) determining that the additional user is not a human in response to determining that the patterns of the additional user's gaze are not consistent with the human gaze patterns.

In one embodiment, a system for implementing the above-described method may include (1) a presenting module, stored in memory, that presents an image to a user of a computing device via a display element of the computing device, (2) a tracking module, stored in memory, that tracks the user's gaze as the image is presented to the user, (3) a determining module, stored in memory, that determines, based on an analysis of the user's gaze, that one or more patterns of the user's gaze are consistent with one or more human gaze patterns, (4) a classifying module, stored in memory, that classifies the user as a human in response to determining that the one or more patterns of the user's gaze are consistent with one or more human gaze patterns, and (5) at least one physical processor configured to execute the presenting module, the tracking module, the determining module, and the classifying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) present an image to a user of the computing device via a display element of the computing device, (2) track the user's gaze as the image is presented to the user, (3) determine, based on an analysis of the user's gaze, that one or more patterns of the user's gaze are consistent with one or more human gaze patterns, and (4) classify the user as a human in response to determining that the one or more patterns of the user's gaze are consistent with one or more human gaze patterns.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of exemplary prompts used for verifying that operators are human.

Figure 1:
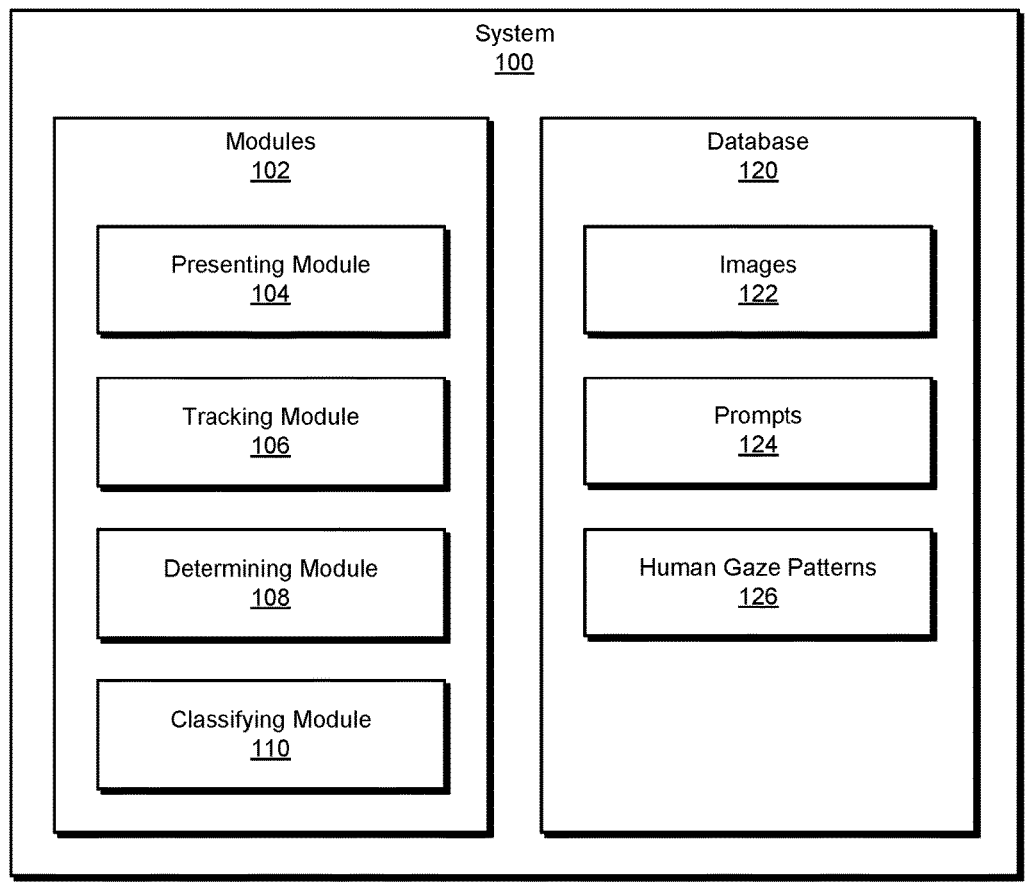
FIG. 1 is a block diagram of an exemplary system for verifying that operators are human based on operator gaze.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for verifying that operators are human based on operator gaze. As will be explained in greater detail below, the disclosed systems and methods provide a verification protocol that verifies that an operator is a human based on digital information obtained from the operator's gaze, which may not involve requiring the operator to submit information such as a solution to a logical challenge.

In some examples, this verification protocol may include presenting an image to an operator and analyzing the operator's gaze with respect to the image to determine whether the operator's gaze matches human gaze patterns. If the operator's gaze matches human gaze patterns, the verification protocol may conclude that the operator is likely human. If the operator's gaze does not match human gaze patterns, the verification protocol my flag the operator as a potentially non-human entity (such as a bot or a troll). By verifying that an operator is human based on the operator's unconscious (or minimally conscious) gazing patterns, the disclosed systems and methods may avoid the false negatives and false positives engendered by logical challenges that are both cumbersome to humans and easily circumvented by automated software.

The following will provide, with reference to FIGS. 1-2 and 4-7, detailed descriptions of exemplary systems for verifying that operators are human based on operator gaze. Detailed descriptions of corresponding computer-implemented methods will also be provided in connection with FIGS. 3 and 4-7. In addition, detailed descriptions of an exemplary computing system and network architecture capable of implementing one or more of the embodiments described herein will be provided in connection with FIGS. 8 and 9, respectively.

FIG. 1 is a block diagram of exemplary system 100 for verifying that operators are human based on operator gaze. As illustrated in this figure, exemplary system 100 may include one or more modules 102 for performing one or more tasks. For example, and as will be explained in greater detail below, exemplary system 100 may include a presenting module 104 that presents an image to a user of the computing device via a display element of the computing device. Exemplary system 100 may additionally include a tracking module 106 that tracks the user's gaze as the image is presented to the user. Exemplary system 100 may also include a determining module 108 that determines, based on an analysis of the user's gaze, that one or more patterns of the user's gaze are consistent with one or more human gaze patterns. Exemplary system 100 may additionally include a classifying module 110 that classifies the user as a human in response to determining that the one or more patterns of the user's gaze are consistent with one or more human gaze patterns. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 810 in FIG. 8, and/or portions of exemplary network architecture 900 in FIG. 9. One or more of modules 102 in FIG. 1 may also represent all or portions of one or more special-purpose computers configured to perform one or more tasks. In one embodiment, one or more of modules 102 may operate as part of a cloud-based human verification application running on commodity hardware in browsers that support an HTML5 standard.

As illustrated in FIG. 1, exemplary system 100 may also include one or more databases, such as database 120. In one example, database 120 may be configured to store images 122, prompts 124, and human gaze patterns 126. Database 120 may represent portions of a single database or computing device or a plurality of databases or computing devices. For example, database 120 may represent a portion of server 206 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as server 206 in FIG. 2, computing system 810 in FIG. 8, and/or portions of exemplary network architecture 900 in FIG. 9.

Figure 2:
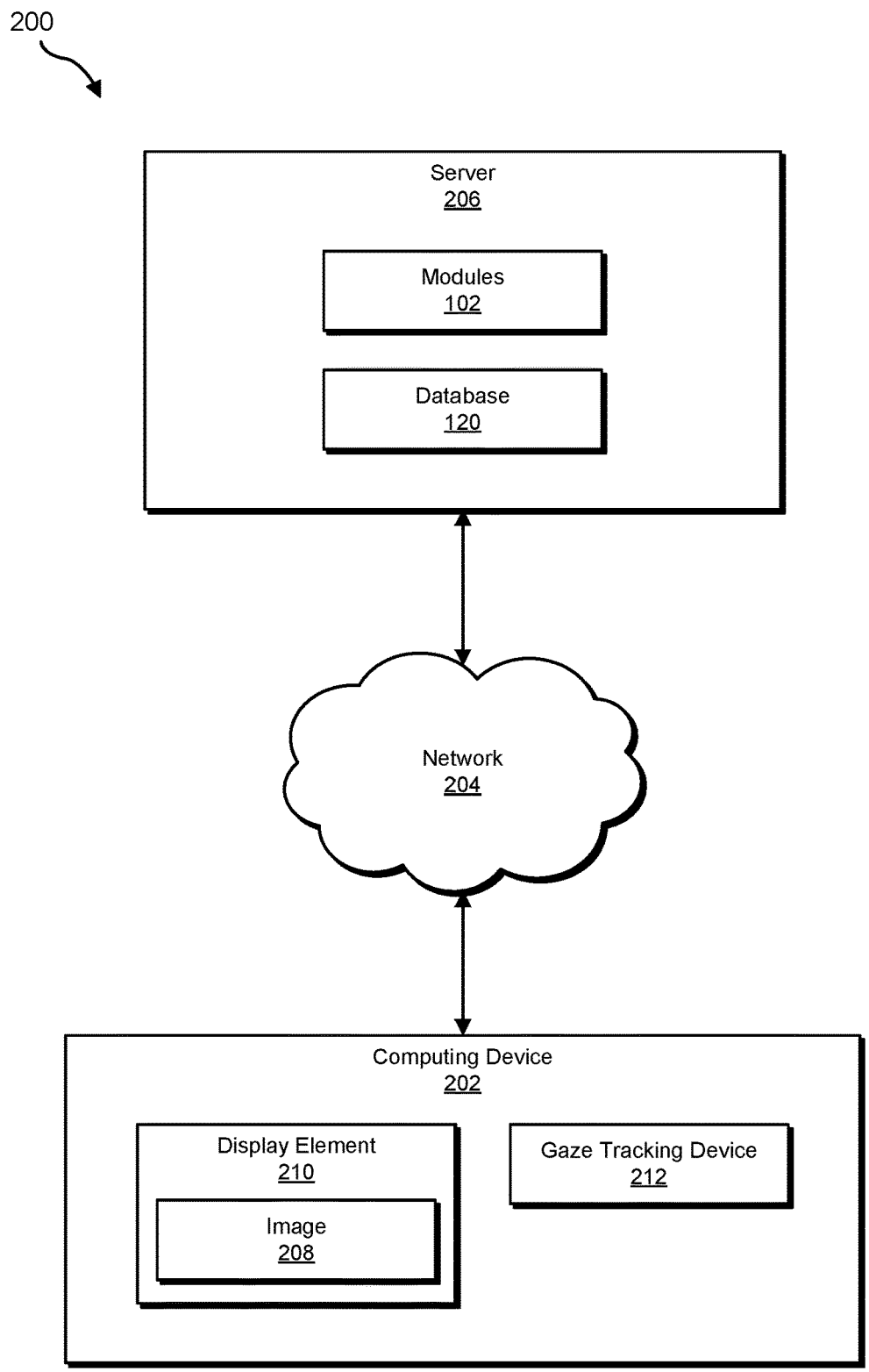
FIG. 2 is a block diagram of an additional exemplary system for verifying that operators are human based on operator gaze.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to verify that operators are human based on operator gaze. For example, and as will be described in greater detail below, presenting module 104 may present an image 208 to a user of computing device 202 via a display element 210 of computing device 202. Tracking module 106 may track the user's gaze (e.g., using a gaze tracking device 212) as image 208 is presented to the user. Determining module 108 may determine, based on an analysis of the user's gaze, that one or more patterns of the user's gaze are consistent with one or more human gaze patterns. Classifying module 110 may classify the user as a human in response to the determination that the one or more patterns of the user's gaze are consistent with one or more human gaze patterns.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device. In some examples, computing device 202 may represent a computing device that is capable of capturing a user's gaze. This capacity may result from computing device 202 being communicatively coupled to a gaze tracking device such as gaze tracking device 212.

Display element 210 generally represents any type or form of computer monitor that provides an electronic visual display for computing device 202. In some examples, display element 210 may display image 208. Gaze tracking device 212 generally represents any type or form of device capable of acquiring and/or processing gaze data. In some examples, gaze tracking device 212 may represent a digital camera, such as a webcam, that is communicatively coupled to computing device 202. In some embodiments, gaze tracking device 212 may connect to computing device 202 via a cable, such as a Universal Serial Bus (USB) cable. Additionally or alternatively, gaze tracking device 212 may be built into the hardware of computing device 202. In some examples, gaze tracking device 212 may communicate wirelessly with computing device 202.

Server 206 generally represents any type or form of computing device that is capable of managing a human verification protocol. Examples of server 206 include, without limitation, application servers and database servers configured to provide various database services and/or run certain software applications. In some examples, server 206 may operate as part of an organization providing an online service to the user. In other examples, server 206 may operate as a third-party service utilized by such an organization.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and server 206.

Figure 3:
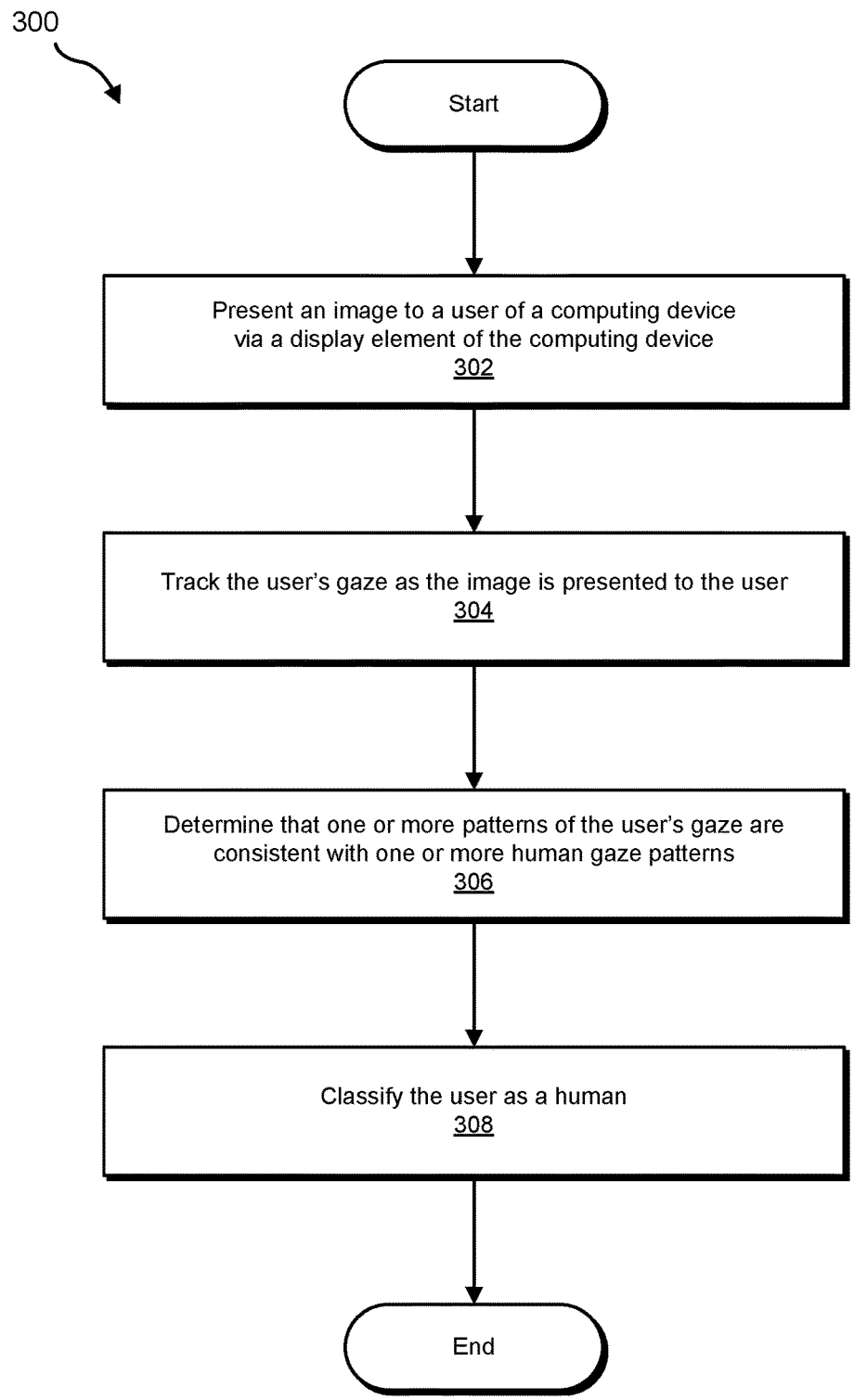
FIG. 3 is a flow diagram of an exemplary method for verifying that operators are human based on operator gaze.

FIG. 3 is a flow diagram of an exemplary computer-implemented method 300 for verifying that operators are human based on operator gaze. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302, one or more of the systems described herein may present an image to a user of the computing device via a display element of the computing device. For example, presenting module 104 may, as part of computing device 202 in FIG. 2, present image 208 to a user of computing device 202 via display element 210 of computing device 202.

Figure 4:
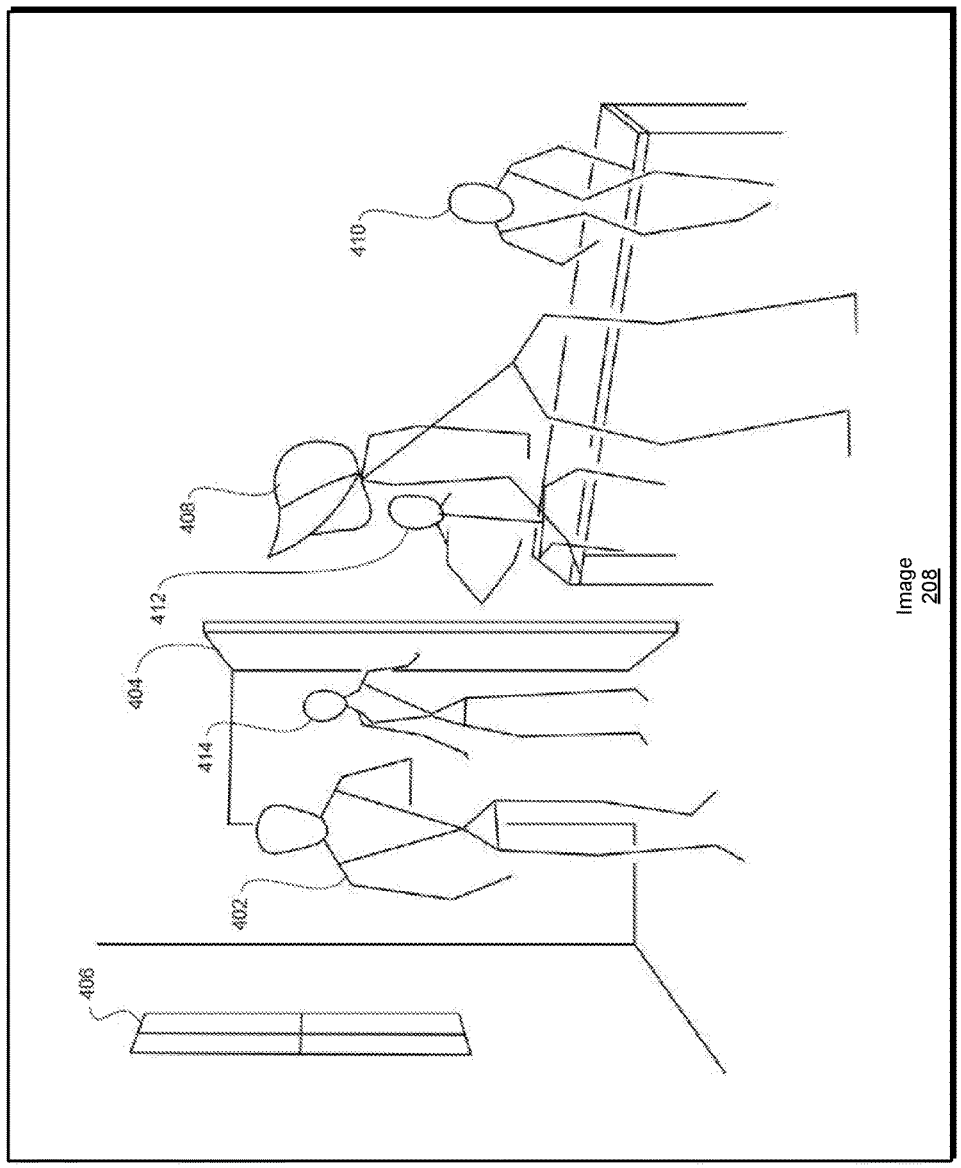
FIG. 4 is a block diagram of an exemplary image used for verifying that operators are human.
Figure 6:
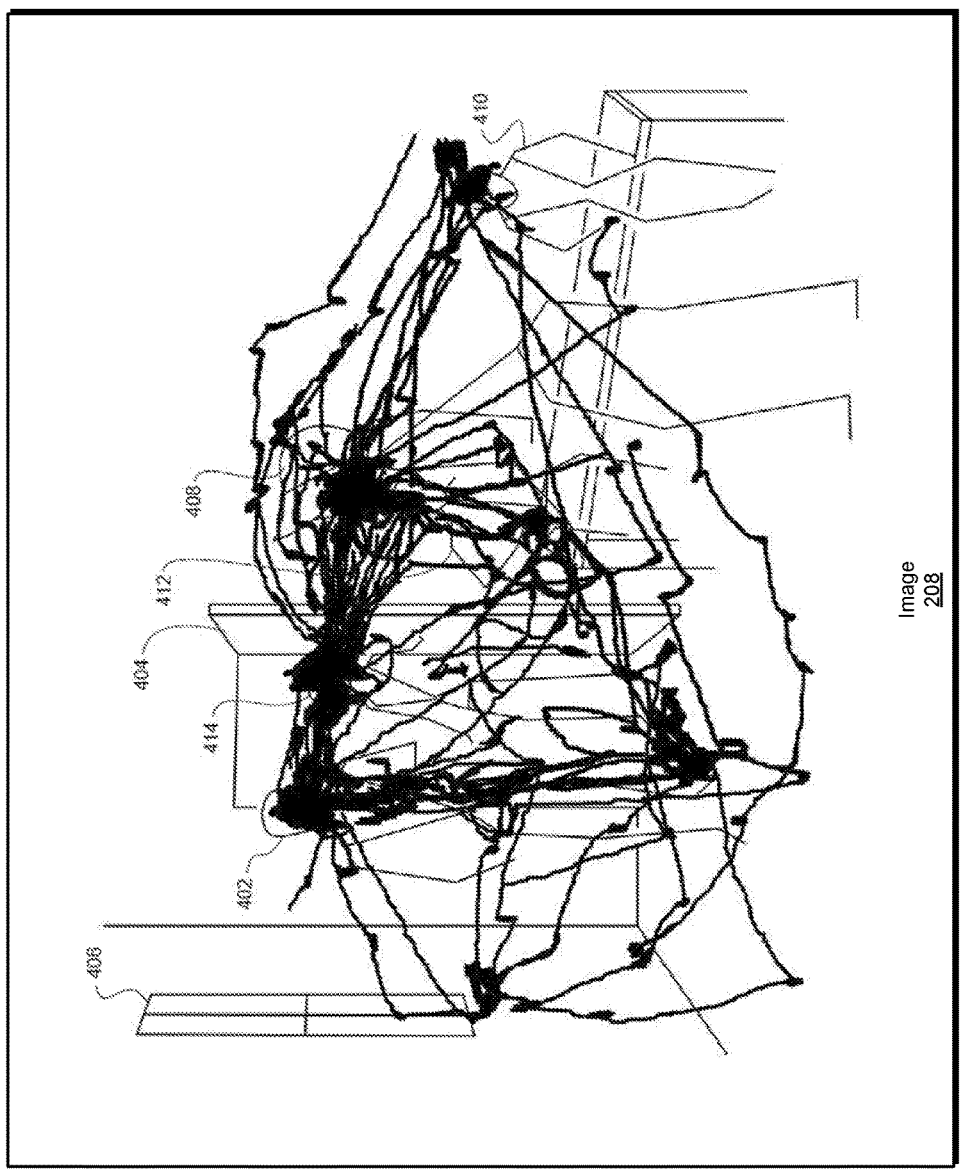
FIG. 6 is a block diagram of an exemplary gaze pattern of a user.

As used herein, the term "image" generally refers to any type or form of digital visual image. In some examples, image 208 may represent a static image. For example, as illustrated in FIG. 4, image 208 may represent a static image of a man 402 entering through a door 404, being opened by an additional man 414, into a room with a window 406, a woman 408, a child 410, and an additional child 412. Additionally or alternatively, image 208 may represent a motion picture. In some examples, image 208 may represent an advertisement and/or a movie trailer.

Presenting module 104 may present image 208 in response to a variety of events. In some examples, presenting module 104 may present image 208 in response to determining that the user has attempted to perform certain actions. For example, presenting module 104 may present image 208 in response to determining that the user has attempted to perform an action that an online service has indicated may only be performed by human operators. Such an action may include, for example, changing a password, logging into a service, modifying an account, etc. As another example, presenting module 104 may present image 208 in response to determining that the user has attempted to perform an action that the online service has labeled as suspicious. For example, presenting module 104 may present image 208 in response to determining that the user has made more than a threshold number of login attempts or has attempted to create more than a threshold number of accounts.

In some examples, presenting module 104 may present image 208 in response to identifying a request to provide human verification for the user. In these examples, presenting module 104 may operate as part of a third-party service that provides human verification for an online service that requests the human verification.

In some examples, presenting module 104 may prime the user to gaze at image 208 in a particular way. For example, presenting module 104 may, prior to presenting image 208, present the user with a prompt that primes the user. FIG. 5 represents a repertoire of such prompts (i.e., prompts 124) that may be maintained by a database, such as database 120. In some examples, a prompt may prime the user by directly instructing the user to gaze at image 208 in a particular way. For example, as shown in FIG. 5, a prompt may instruct the user to "look at the faces of the children."

In other examples, a prompt may prime the user without directly instructing the user to gaze at any particular portion of image 208. For example, as shown in FIG. 5, a prompt may ask "how old are the people in this picture?" Such a prompt may alter which portions of image 208 are gazed upon by the user, even though the prompt does not directly instruct the user about his gaze. For example, the prompt "how old are the people in this picture?," when presented before presenting image 208 illustrated in FIG. 4, may prime the user to pay particular attention to elements of image 208 that are indicative of the ages of the depicted people (e.g., the faces, clothes, or size of man 402, additional man 414, woman 408, child 410, and additional child 412).

To give another example of a suggestive prompt, as shown in FIG. 5, a prompt may include the sentence "it looks like it might rain." While this prompt does not directly instruct the user to gaze at any particular portion of image 208, the intuitive impulse of a human, when told it may rain, may be to gaze at the sky or out a window. Thus, such a prompt, when presented before presenting image 208 illustrated in FIG. 4, may prime the user to gaze at window 406. To give another example, also shown in FIG. 5, a prompt may include the sentence "I think I'm in danger!" A human, when told of potential danger, may intuitively search for the source of the danger. Thus, such a prompt, when presented before presenting image 208 illustrated in FIG. 4, may prime the user to gaze at man 402 as he enters the room. To give a final example, also illustrated in FIG. 5, a prompt may include the sentence "am I going to find the right girl to marry?" Such a prompt, when presented before presenting image 208 illustrated in FIG. 4, may have the effect of priming the user to gaze at woman 408 as man 402 walks toward her.

In some examples, database 120 may maintain a collection of images, such as images 122, made up of images that may be used for human verification, such as image 208. In these examples, presenting module 104 may obtain image 208 from database 120 prior to presenting image 208 to the user.

Returning to FIG. 3, at step 304, one or more of the systems described herein may track the user's gaze as the image is presented to the user. For example, tracking module 106 may, as part of computing device 202 and/or gaze tracking device 212 in FIG. 2, track the user's gaze as image 208 is presented to the user. In some examples, gaze tracking device 212 may track the user's gaze by (1) identifying localities at which the user is gazing, (2) identifying, based on the localities, portions of image 208 at which the user is gazing, and (3) determining a manner in which the user gazes at the portions of image 208.

Tracking module 106 may identify the localities at which the user is gazing in a variety of ways. For example, tracking module 106 may rely on a device embedded in and/or coupled to computing device 202 to transmit a light source (such as an infrared beam) at the eyes of the user. In this example, tracking module 106 may rely on a sensor (e.g., a sensor embedded in and/or coupled to computing device 202 and/or gaze tracking device 212) to identify a reflection of the light source from the eyes. Then, tracking module 106 may analyze the reflection to determine the direction of the user's gaze. In one example, tracking module 106 may also identify changes in the user's gaze based on changes in the identified reflection.

In one example, tracking module 106 may identify (e.g., based on the reflection, a size of digital display 210, and/or a position of the user relative to digital display 210) pixel coordinates on display element 210 at which the user is gazing. In some examples, tracking module 106 may determine that, at a first moment in time, the user is gazing at a first set of pixel coordinates and that, at a second moment in time, the user changes his gaze and is gazing at a second set of pixel coordinates.

In some examples, tracking module 106 may identify (e.g., based on the identified pixel coordinates) one or more portions of image 208 at which the user is gazing. For example, tracking module 106 may (1) determine at which pixel coordinates, within display element 210, the various portions of image 208 are displayed and (2) determine at which pixel coordinates the user is gazing. Then, (3) tracking module 106 may conclude that the user is gazing at the portions of image 208 that correspond to the pixel coordinates at which the user is gazing. Using FIG. 6 as an example, tracking module 106 may determine that the user, in response to being presented with image 208 as illustrated in FIG. 4, focuses his gaze on the pixel coordinates that correspond to (1) the faces of man 402, woman 408, child 410, additional child 412, and additional man 414, (2) the clothes of man 402, woman 408, and additional child 412, and (3) window 406. In this example, tracking module 106 may conclude, based on this determination, that these are the portions of image 208 at which the user is gazing.

After identifying the portions of image 208 at which the user is gazing, tracking module 106 may identify a manner in which the user gazes at the portions. For example, tracking module 106 may identify (1) an order in which the user gazes at the portions and/or (2) a duration for which the user gazes at the portions.

First, tracking module 106 may identify an order in which the user gazes at the portions. Using the previous example from FIG. 6, tracking module 106 may determine that the user gazes at portions of image 208 in the following order: (1) the user begins by gazing at the face of man 402, (2) the user shifts his gaze to the face of additional man 414, (3) the user shifts his gaze to the face and then clothes of woman 408, (4) the user shifts his gaze to the face and then clothes of additional child 412, (5) the user shifts his gaze to the face of child 410, (6) the user shifts his gaze to window 406, and finally (7) the user ends with his gaze on the clothes of man 402.

Second, tracking module 106 may determine a duration for which the user gazes at the portions of image 208. Tracking module 106 may determine a gaze duration in various ways. In some such examples, tracking module 106 may determine a duration for which the user gazes at each of the portions met by the user's gaze. For example, using the previous example from FIG. 6, tracking module 106 may determine that (1) the user gazes at the face of man 402 for half a second, (2) the user gazes at the face of additional man 414 for a quarter of a second, (3) the user gazes at the face and clothes of woman 408 for half a second, (4) the user gazes at the face and clothes of additional child 412 for half of a second, (5) the user gazes at the face of child 410 for an eighth of a second, (6) the user gazes at window 406 for a quarter of a second, and (7) the user gazes at the clothes of man 402 for an eighth of a second. Additionally or alternatively, tracking module 106 may determine the total duration for which the user gazes at any portion within image 208. For example, using the previous example from FIG. 6, tracking module 106 may determine that the total duration for which the user gazes at any portion of image 208 was two and a quarter seconds.

Additionally or alternatively, tracking module 106 may determine a duration for which the user gazes at particular designated portions of image 208 (e.g., portions that are designated in a policy). These particular portions may be selected based on information from established human gaze patterns, as will be discussed later in connection with step 306. To give a specific example, tracking module 106 may track the total time for which the user gazes at the faces depicted in image 208 illustrated in FIG. 4 (e.g., without regard to determining the time for which the user gazes at non-face portions of image 208 illustrated in FIG. 4). To give another example using FIG. 4, tracking module 106 may track the amount of time the user gazes at a particular face depicted in image 208, such as the face of man 402.

In some examples, tracking module 106 may also be programmed to identify specific gaze behaviors that have been designated as suspicious and/or indicative of a non-human automated procedure. For example, tracking module 106 may be programmed to identify linear gaze patterns, such as a gaze that drifts linearly through the image from left to right and/or top to bottom without prioritizing and/or resting on humans or objects. In another example, tracking module 106 may be programmed to identify gaze patterns that are consistent with an image previously used by a human verification service, but that are not consistent with image 208. Such a gaze pattern may indicate an automated operator programmed to circumvent the gaze-based human verification protocol. In one embodiment, tracking module 106 may determine that an additional user, to whom presenting module 104 has presented image 208, has exhibited one of these suspicious gaze behaviors.

Returning to FIG. 3, at step 306, one or more of the systems described herein may determine, based on an analysis of the user's gaze, that one or more patterns of the user's gaze are consistent with one or more human gaze patterns. For example, determining module 108 may, as part of computing device 202 in FIG. 2, determine, based on an analysis of the user's gaze, that one or more patterns of the user's gaze are consistent with one or more human gaze patterns.

As used herein, the term "human gaze pattern" generally refers to any type or form of gaze pattern that has previously been exhibited by a human or group of humans and/or that a policy predicts would be exhibited by a human. In some examples, a human gaze pattern may be specific to a particular image. In these examples, a human gaze pattern may include (1) portions of the particular image that were a point of gaze for humans who were presented with the particular image (and/or which are predicted to attract human gaze), (2) an order in which humans previously gazed (and/or are predicted to gaze) at the portions, and/or (3) a duration for which humans gazed (and/or are predicted to gaze) at the portions (e.g., each of the portions, particular portions, any of the portions), etc.

In additional or alternative examples, a human gaze pattern may be general. In these examples, a human gaze pattern may include general rules of human gazing behavior. To give a specific example, a human gaze patterns may include a general rule that a human, who has not been primed to do otherwise, is likely to gaze at human faces before he or she gazes at other portions of an image. Some general rules may take into account a type of priming. For example, one general rule may indicate that a human, who is primed with a prompt that deals with weather before he or she is shown an image, is likely to gaze at depictions of the sky or objects that lead to the outdoors, such as a window or an open door, when he or she is shown the image.

Determining module 108 may determine that a pattern of the user's gaze is consistent with human gaze patterns in a variety of ways. In some examples, determining module 108 may (1) identify human gaze patterns that are applicable to image 208 and (2) determine that a pattern of the user's gaze is consistent with the identified human gaze patterns.

Determining module 108 may identify the applicable human gaze patterns multiple ways. In some examples, determining module 108 may identify human gaze patterns that are based on the gaze of humans who have previously been presented with image 208. In some examples, the humans may have been presented with image 208 in a test group setting. In these examples, an entity that provides human verification services (and/or a third-party entity relied on by the entity that provides human verification services) may have presented image 208 to the humans for the purpose of testing the image in a dedicated testing environment. In some examples, the entity that provides human verification services may present a first image to a user as part of a human verification process and then present a second clip to the user for training purposes.

In additional or alternative examples, the humans may have been presented with image 208 via unsupervised crowdsourcing. In these examples, an online service, whose primary purpose in presenting image 208 is not collecting gazing data about image 208, may display image 208 on a website (e.g., as part of an advertisement or movie trailer). For example, image 208 may be displayed on news sites, social networks and/or as part of previous human verification attempts. In these examples, the online service may gather human gaze data from its users as the online service is displaying image 208.

Figure 7:
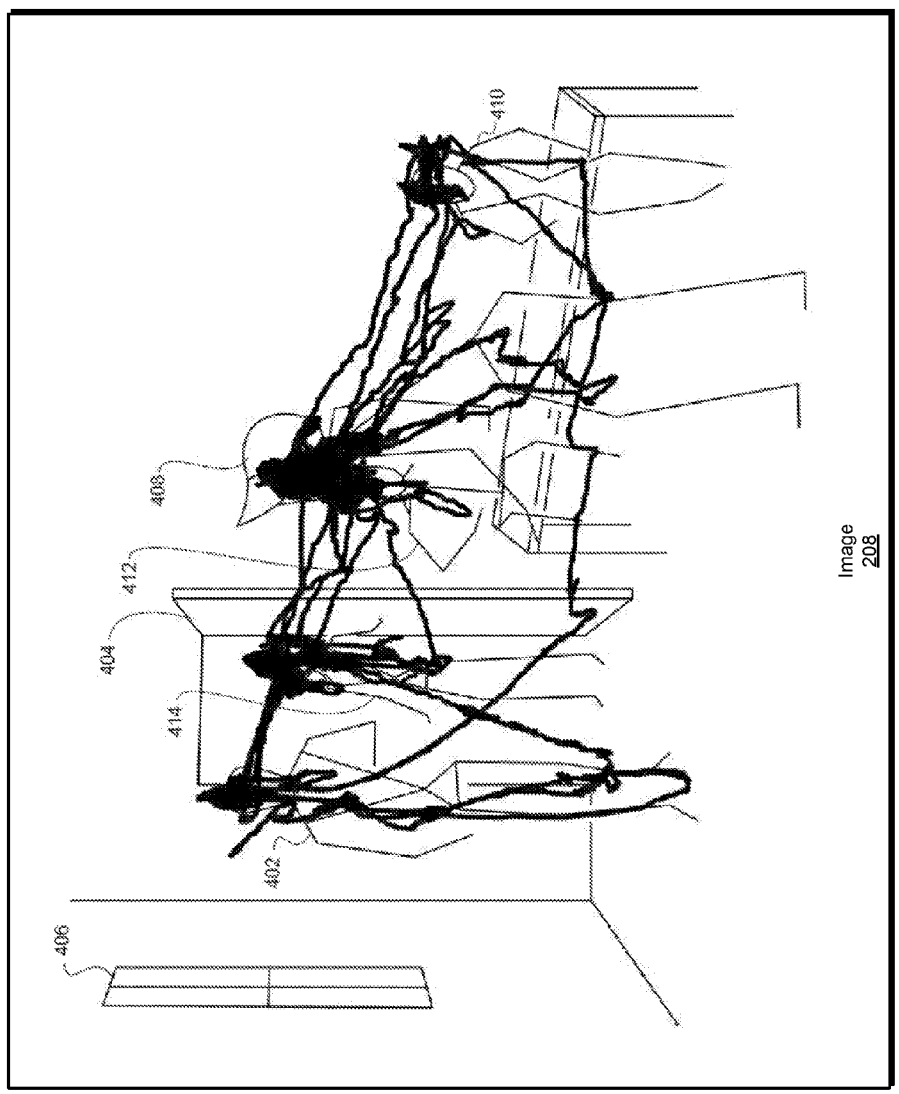
FIG. 7 is a block diagram of an additional exemplary human gaze pattern.

In some examples, the humans relied on in the test group and/or the crowdsourcing may have been primed to view image 208 in a particular way, in the same way that the user may be primed (as discussed above in connection with step 302). In these examples, the resulting human gaze patterns obtained from the humans may vary based on the conditioning applied to the humans. For example, FIG. 7 illustrates a human gaze pattern of a human who, prior to being shown image 208 as illustrated in FIG. 4, is primed with a prompt that asks "how old are the people in this picture?" In this example, the resulting human gaze pattern focuses on portions of image 208 that bear on people's ages (i.e., the faces and clothes of the persons pictured in image 208), and does not focus on portions of image 208 that do not bear on people's ages (e.g., window 406 or door 404). In examples where the user is primed to view image 208 in a particular way, determining module 108 may compare the user's gaze patterns against human gaze patterns of humans who were primed in a similar way.

In addition, or as an alternative, to identifying human gaze patterns based on gazing data collected from humans, determining module 108 may identify human gaze patterns that were designated by an administrator (e.g., based on an educated guess of the administrator). In some examples, a set of human gaze patterns may be maintained in a database. For example, human gaze patterns 126 may be maintained by database 120. In these examples, human gaze patterns may be continually and/or periodically updated as new gaze data is collected. In these examples, determining module 108 may identify human gaze patterns 126 by obtaining human gaze patterns 126 from database 120.

After identifying human gaze patterns, determining module 108 may determine that gaze patterns of the user are consistent with the identified human gaze patterns. Determining module 108 may determine that the patterns of the user are consistent with the identified human gaze patterns in various ways. In some examples, determining module 108 may determine that portions of image 208 gazed upon by the user match the portions identified in the human gaze patterns. To give a specific example, determining module 108 may determine that (1) the user gazes at the face of man 402 illustrated in FIG. 4 and (2) the face of man 402 was gazed upon by humans who were previously presented with image 208 and/or is predicted to be gazed upon by humans.

In one example, determining module 108 may determine that the portions gazed upon by the user match those present in the human gaze patterns if a threshold number and/or a threshold percentage of the portions gazed upon by the user match portions of image 208 present in the human gaze patterns. In another example, determining module 108 may determine that the portions gazed upon by the user match those present in the human gaze patterns only if the user gazes upon one or more particular portions present in the human gaze patterns (e.g., portions designated in a policy).

In some examples, determining module 108 may determine that an order in which the user gazes upon portions of image 208 matches an order present in the human gaze patterns. To give a specific example, determining module 108 may determine that the user's gaze order matches an order present in the human gaze patterns based on determining (1) that the user gazes at the face of man 402 and, sometime later, gazes at the face of woman 408 and (2) that a threshold number and/or percentage of humans who were previously presented with 208 gazed at the face of man 402 before gazing at the face of woman 408.

In some examples, determining module 108 may determine that the user's gazing pattern matches human gazing patterns if (and, in some examples, only if) a particular change in gaze occurs. To give a specific example, image 208 may represent a motion picture that suggests, at a certain point in time, that an invader may imminently be entering through a door (e.g., through a change in music, spoken or written words, a change in lighting etc.). In this specific example, human gaze patterns may indicate that a human is likely to gaze at the door at the certain point in time. Thus, in this specific example, determining module 108 may determine that the user's gazing pattern matches human gaze patterns if the user gazes at the door at the certain point in time.

In some examples, determining module 108 may determine that a duration for which the user gazes at portions of image 208 (e.g., a duration for each portion, a duration for a particular portion, a duration for any of the portions, etc.) matches a duration present in the human gaze patterns. In one example, the duration present in the human gaze patterns may be a range. In this example, determining module 108 may determine that a duration for which the user gazes at portions of image 208 matches a range of duration present in the human gaze patterns if the user's falls within the range. To give a specific example, determining module 108 may determine that (1) the user gazed at the face of woman 408 for two seconds and (2) two seconds is within a range of duration for which other humans have, when presented with image 208, gazed at the face of woman 408.

In some embodiments, determining module 108 may create a model for determining whether the user's gaze patterns match the human gaze patterns. This model may be based on the variety of aspects of human gaze patterns discussed above. For example, the model may indicate that the user's gaze pattern matches the human gaze patterns if (1) specified aspects of the human gaze pattern are present in the user's gaze, (2) a threshold number and/or percentage of aspects identified in the user's gaze pattern match aspects of the human gaze pattern, and/or (3) any combination thereof.

In one example, an additional user may have been presented with image 208 and the additional user's gaze may have been tracked as image 208 was presented to the additional user, as discussed above in connection with step 304. In this example, determining module 108 may determine that one or more patterns of the additional user are not consistent with the human gaze patterns. Determining module 108 may determine that the patterns of the additional user are not consistent with the human gaze patterns for a variety of reasons. In some examples, determining module 108 may determine that the user's patterns are not consistent because (1) the portions of image 208 gazed upon by the additional user do not match a portion present in the human gaze patterns, (2) an order in which the additional user gazes upon portions of image 208 does not match an order present in the human gaze patterns, (3) a duration for which the additional user gazes at image 208 is not consistent a duration predicted by the human gaze patterns, and/or (4) any combination thereof. Additionally or alternatively, determining module 108 may determine that one or more aspects of the additional user's gaze pattern coincide with behaviors that have been designated as suspicious, such as the suspicious behaviors described in connection with step 304.

Returning to FIG. 3, at step 308, one or more of the systems described herein may classify the user as a human in response to determining that one or more patterns of the user's gaze are consistent with one or more human gaze patterns. For example, classifying module 110 may, as part of computing device 202 in FIG. 2, classify the user as a human in response to determining that one or more patterns of the user's gaze are consistent with one or more human gaze patterns.

Classifying the user as a human may trigger a variety of events. In some examples, classifying module 110 may notify an online service (e.g., an online service that requested that the user be verified as a human) of the classification. In additional or alternative examples, classifying module 110 may allow the user to perform an action that requires human verification (e.g., changing a password, logging into an account, etc.).

In some examples, as discussed above in connection with step 306, determining module 108 may have determined that an additional user's gaze patterns are not consistent with human gaze patterns. In these examples, classifying module 110 may determine that the additional user is not a human based on the additional user's gaze patterns not matching the human gaze patterns.

Classifying the additional user as not human may trigger a variety of events. In one example, classifying module 110 may notify an online service (e.g., an online service that requested that the humanness of the user be verified) that the additional user may not be human and/or may be attempting to access the online service as part of a malicious attack. In some examples, classifying module 110 may prevent the additional user from performing an action that requires human verification (e.g., changing a password, logging into an account, etc.). Additionally or alternatively, classifying module 110 may require that the user complete a remediation process before allowing the user to perform the action that requires human verification.

As described above, the disclosed systems and methods may determine whether an operator is human without requiring the operator to perform tasks that require conscious processing on the part of the operator. In one example, the operator is presented with an image, a sequence of images, or a short video clip (such as a movie commercial or a cartoon). While the operator is watching the presented imagery, information is collected about the operator's gazing behavior. This information may include the operator's point of gaze, changes in the operator's point of gaze, a duration of the operator's gaze, etc. After collecting this information, the disclosed systems and methods may compare the operator's gaze behavior with the gaze behavior of other humans and/or with gaze behavior that would be expected from a human. If the operator's gaze behavior aligns with human gaze behavior, the disclosed systems and methods may verify that the operator is human.

Artificially mimicking these gaze patters, which occur naturally and unconsciously for humans, may be difficult, if not impossible, for automated software. As such, by determining whether an operator is human based on gaze behavior, the disclosed systems and methods may test for humanness using a test that many humans will pass with very little cognitive effort but that attacking software is unlikely to successfully complete.

Figure 8:
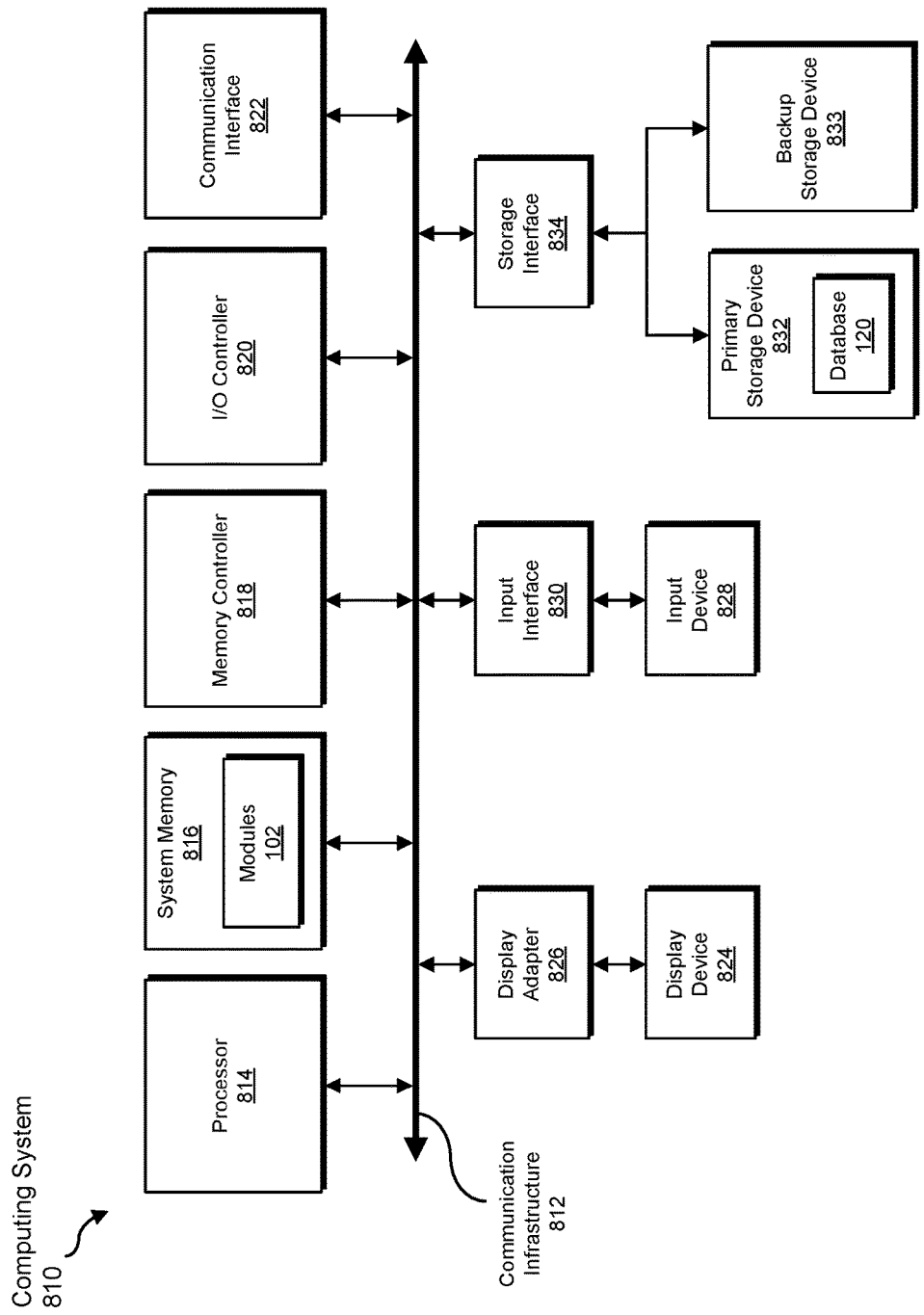
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
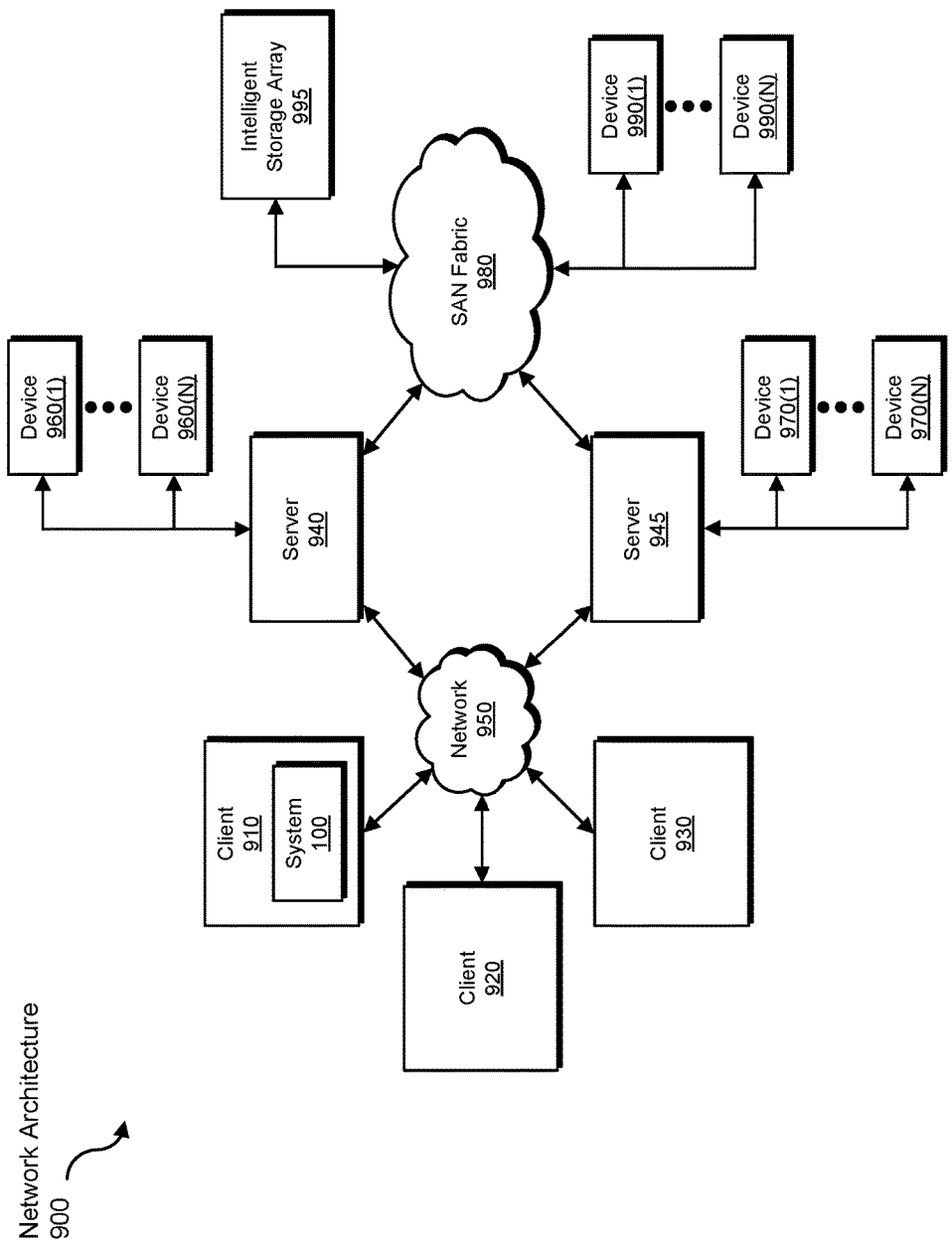
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for verifying that operators are human based on operator gaze.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive reflection data, transform the reflection data into gaze pattern data, and use the result of the transformation to determine whether an operator is human. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for verifying that operators are human based on operator gaze, at least a portion of the method being performed by a computing device comprising at least one processor, the method comprising:
    presenting an image to a user of a computing device, who is purporting to be a human, via a display element of the user's computing device;
    tracking the user's gaze as the image is presented to the user using a tracking device that:
        transmits a light source at one or both eyes of the user;
        identifies at least one of a reflection of the light source from the eyes of the user and a change in reflection from the eyes of the user;
        analyzes at least one of the reflection and the change in reflection to determine at least one of a direction of the user's gaze and a change in the direction of the user's gaze;
    identifying one or more human gaze patterns specific to the image based on at least one of:
        gaze patterns exhibited by one or more additional humans to whom the image was previously exhibited;
        a policy that predicts human gaze patterns with respect to images;
    determining, based on an analysis of the user's gaze, that one or more patterns of the user's gaze are consistent with the human gaze patterns of the one or more additional humans;
    classifying the user as a human in response to determining that the one or more patterns of the user's gaze are consistent with the human gaze patterns of the one or more additional humans.

2. The computer-implemented method of claim 1, wherein presenting the image to the user comprises presenting the image in response to at least one of:
    determining that the user has attempted to perform an action that an online service has indicated may only be performed by human operators;
    identifying a request to provide human verification for the user.

3. The computer-implemented method of claim 1, wherein presenting the image to the user comprises presenting at least one of:

a motion picture image;
a static image.

4. The computer-implemented method of claim 1, further comprising, prior to presenting the image to the user, presenting a prompt that primes the user to gaze at the image in a particular way.

5. The computer-implemented method of claim 4, wherein determining that the patterns of the user's gaze are consistent with the human gaze patterns comprises determining that the patterns of the user's gaze are consistent with one or more gaze patterns of humans who, prior to being presenting with an instance of the image, have also been presented with an instance of the prompt.

6. The computer-implemented method of claim 1, wherein tracking the user's gaze comprises tracking at least one of:
   one or more portions of the image at which the user is gazing;
   an order in which the user gazes at the one or more portions;
   a duration for which the user gazes at each of the one or more portions;
   a duration for which the user gazes at a certain portion of the image;
   a duration for which the user gazes at any portion within the image.

7. The computer-implemented method of claim 1, wherein determining that the patterns of the user's gaze are consistent with the human gaze patterns comprises determining that:
   the user's gaze is directed at a certain location;
   a human who is presented with the image is likely to gaze at the certain location.

8. The computer-implemented method of claim 1, wherein determining that the patterns of the user's gaze are consistent with the human gaze patterns comprises determining that:
   the user's gaze shifts from a first location to an additional location;
   a human who is presented with the image is likely to shift his or her gaze from the first location to the additional location.

9. The computer-implemented method of claim 1, wherein determining that the patterns of the user's gaze are consistent with the human gaze patterns comprises determining that the user's gaze is maintained for a certain period of time that falls within a range of time periods for which a human is likely to gaze at the image.

10. The computer-implemented method of claim 1, further comprising identifying the human gaze patterns based on human gaze patterns of a plurality of humans while the plurality of humans were being presented with the image.

11. The computer-implemented method of claim 10, wherein identifying the human gaze patterns based on gaze patterns exhibited by one or more humans to whom the image was previously exhibited comprises at least one of:
   obtaining the human gaze patterns of the one or more humans from a supervised test group;
   obtaining the human gaze patterns of the one or more humans via unsupervised crowd surfing based on gaze data obtained from a website of an online service whose primary purpose in presenting the image is not collecting gazing data about the image.

12. The computer-implemented method of claim 1, further comprising:
   presenting the image to an additional user of an additional computing device via a display element of the additional computing device;
   tracking the additional user's gaze as an instance of the image is presented to the additional user;
   determining, based on an analysis of the additional user's gaze, that one or more patterns of the additional user's gaze are not consistent with the human gaze patterns;
   determining that the additional user is not a human in response to determining that the patterns of the additional user's gaze are not consistent with the human gaze patterns.

13. A system for verifying that operators are human based on operator gaze, the system comprising:
   a presenting module, stored in memory, that presents an image to a user of a computing device, who is purporting to be a human, via a display element of the computing device;
   a tracking module, stored in memory, that tracks the user's gaze as the image is presented to the user using a tracking device that:
      transmits a light source at one or both eyes of the user;
      identifies at least one of a reflection of the light source from the eyes of the user and a change in reflection from the eyes of the user;
      analyzes at least one of the reflection and the change in reflection to determine at least one of a direction of the user's gaze and a change in the direction of the user's gaze;
   a determining module, stored in memory, that:
      identifies one or more human gaze patterns specific to the image based on at least one of:
         gaze patterns exhibited by one or more additional humans to whom the image was previously exhibited;
         a policy that predicts human gaze patterns with respect to images;
      determines, based on an analysis of the user's gaze, that one or more patterns of the user's gaze are consistent with the human gaze patterns of the one or more additional humans;
   a classifying module, stored in memory, that classifies the user as a human in response to determining that the one or more patterns of the user's gaze are consistent with the human gaze patterns of the one or more additional humans;
   at least one physical processor configured to execute the presenting module, the tracking module, the determining module, and the classifying module.

14. The system of claim 13, wherein the presenting module presents the image to the user by presenting the image in response to at least one of:
   determining that the user has attempted to perform an action that an online service has indicated may only be performed by human operators;
   identifying a request to provide human verification for the user.

15. The system of claim 13, wherein the presenting module presents the image to the user by presenting at least one of:
   a motion picture image;
   a static image.

16. The system of claim 13, wherein the presenting module, prior to presenting the image to the user, presents a prompt to the user that primes the user to gaze at the image in a particular way.

17. The system of claim 16, wherein the determining module determines that the patterns of the user's gaze are consistent with the human gaze patterns by determining that the patterns of the user's gaze are consistent with one or more gaze patterns of humans who, prior to being presenting with an instance of the image, have also been presented with an instance of the prompt.

18. The system of claim 13, wherein the tracking module tracks the user's gaze by tracking at least one of:
one or more portions of the image at which the user is gazing;
an order in which the user gazes at the one or more portions;
a duration for which the user gazes at each of the one or more portions;
a duration for which the user gazes at a certain portion of the image;
a duration for which the user gazes at any portion within the image.

19. The system of claim 13, wherein the determining module determines that the patterns of the user's gaze are consistent with the human gaze patterns by determining that:
the user's gaze is directed at a certain location;
a human who is presented with the image is likely to gaze at the certain location.

20. A non-transitory computer-readable medium comprising one or more computer-readable instructions that, when executed by at least one processor of a computing device, cause the computing device to:
present an image to a user of a computing device, who is purporting to be a human, via a display element of the user's computing device;
track the user's gaze as the image is presented to the user using a tracking device that:
transmits a light source at one or both eyes of the user;
identifies at least one of a reflection of the light source from the eyes of the user and a change in reflection from the eyes of the user;
analyzes at least one of the reflection and the change in reflection to determine at least one of a direction of the user's gaze and a change in the direction of the user's gaze;
identify one or more human gaze patterns specific to the image based on at least one of:
gaze patterns exhibited by one or more additional humans to whom the image was previously exhibited;
a policy that predicts human gaze patterns with respect to images;
determine, based on an analysis of the user's gaze, that one or more patterns of the user's gaze are consistent with the human gaze patterns of the one or more additional humans;
classify the user as a human in response to determining that the one or more patterns of the user's gaze are consistent the human gaze patterns of the one or more additional humans.

\* \* \* \* \*